US012553818B2

(12) United States Patent
Föertsch et al.

(10) Patent No.: US 12,553,818 B2
(45) Date of Patent: Feb. 17, 2026

(54) METHOD FOR CALIBRATING A PARTICLE SENSOR, PARTICLE SENSOR, AND APPARATUS HAVING A PARTICLE SENSOR

(71) Applicant: Q.ant GmbH, Stuttgart (DE)

(72) Inventors: Michael Föertsch, Ansbach (DE); Stefan Hengesbach, Stuttgart (DE); Jens Grimmel, Tuebingen (DE); Helge Hattermann, Pliezhausen (DE)

(73) Assignee: Q.ANT GMBH, Stuttgart (DE)

( * ) Notice: Subject to any disclaimer, the term of this patent is extended or adjusted under 35 U.S.C. 154(b) by 41 days.

(21) Appl. No.: 18/335,148

(22) Filed: Jun. 15, 2023

(65) Prior Publication Data
US 2023/0324276 A1 Oct. 12, 2023

Related U.S. Application Data

(63) Continuation of application No. PCT/EP2021/085868, filed on Dec. 15, 2021.

(30) Foreign Application Priority Data

Dec. 18, 2020 (DE) ..................... 10 2020 216 258.1

(51) Int. Cl.
*G01N 15/1434* (2024.01)
(52) U.S. Cl.
CPC ................................. *G01N 15/1434* (2013.01)
(58) Field of Classification Search
CPC ... G01N 2015/1029; G01N 2015/1028; G01N 15/1012; G01P 21/025; G01S 17/58
See application file for complete search history.

(56) References Cited

U.S. PATENT DOCUMENTS

| 3,127,464 A | 3/1964 | Gustavson |
| 3,885,415 A | 5/1975 | Burns et al. |
| 4,135,821 A | 1/1979 | Pechin et al. |

(Continued)

FOREIGN PATENT DOCUMENTS

| CN | 102428377 A | 4/2012 |
| CN | 108780030 A | 11/2018 |

(Continued)

OTHER PUBLICATIONS

G. E. Elsinga, "Tomographic particle image velocimetry", Apr. 13, 2006 (Year: 2006).*

(Continued)

*Primary Examiner* — Maurice C Smith
(74) *Attorney, Agent, or Firm* — LEYDIG, VOIT & MAYER, LTD.

(57) ABSTRACT

A method for calibrating a particle sensor includes focusing a laser beam on a calibration plane for generating a calibration intensity distribution in the calibration plane. A calibration plate is arranged in the calibration plane. Contrast regions for modulating an intensity of the laser beam are formed on the calibration plate. The method further includes moving the calibration plate and/or the calibration intensity distribution in the calibration plane, recording at least one intensity signal of the laser beam, following passage through the calibration plane, and calibrating the particle sensor by evaluating the at least one intensity signal.

16 Claims, 2 Drawing Sheets

(56) References Cited

U.S. PATENT DOCUMENTS

| | | |
|---|---|---|
| 4,239,612 A | 12/1980 | Goetz |
| 4,360,270 A | 11/1982 | Jeck |
| 4,636,073 A | 1/1987 | Williams |
| 5,684,585 A | 11/1997 | Girvin |
| 2002/0154295 A1 | 10/2002 | Ivakhnenko et al. |
| 2010/0315638 A1 | 12/2010 | Goohs et al. |
| 2019/0317008 A1 | 10/2019 | Schuda et al. |
| 2020/0292435 A1 | 9/2020 | Spruit et al. |
| 2022/0113240 A1 | 4/2022 | Foertsch et al. |

FOREIGN PATENT DOCUMENTS

| | | | |
|---|---|---|---|
| DE | 102019209213 A1 | 12/2020 | |
| JP | S5440689 A | 3/1979 | |
| JP | S 61108950 A | 5/1986 | |
| JP | S 6211134 A | 1/1987 | |
| JP | 2002350324 A | 12/2002 | |
| JP | 2005315850 A | 11/2005 | |

OTHER PUBLICATIONS

B. Wieneke, "vol. self-calibration for 3D particle image velocimetry", Dec. 2007 (Year: 2007).*

Mohammed El-Adawy, "Stereoscopic particle image velocimetry for engine flow measurements: Principles and applications", Sep. 20, 2020 (Year: 2020).*

International Standard. ISO 21501-1:2009, Determination of particle size distribution—Single particle light interaction methods—Part 1: Light scattering aerosol spectrometer, Status : Published, Publication date : Jun. 2009, Edition : 1, Number of pp. 27, Technical Committee : ISO/TC 24/SC 4 Particle characterization, ICS : 19.120 Particle size analysis. Sieving.

International Standard. ISO 21501-4:2018, Determination of particle size distribution—Single particle light interaction methods—Part 4: Light scattering airborne particle counter for clean spaces, Status : Published, Publication date : May 2018, Edition : 2, Number of pp. 25, Technical Committee : ISO/TC 24/SC 4 Particle characterization, ICS : 19.120 Particle size analysis. Sieving.

* cited by examiner

METHOD FOR CALIBRATING A PARTICLE SENSOR, PARTICLE SENSOR, AND APPARATUS HAVING A PARTICLE SENSOR

CROSS-REFERENCE TO PRIOR APPLICATION

This application is a continuation of International Application No. PCT/EP2021/085868 (WO 2022/129158 A1), filed on Dec. 15, 2021, and claims benefit to German Patent Application No. DE 10 2020 216 258.1, filed on Dec. 18, 2020. The aforementioned applications are hereby incorporated by reference herein.

FIELD

Embodiments of the present invention relate to a method for calibrating a particle sensor, to a particle sensor, and to an apparatus having at least one such particle sensor.

BACKGROUND

Particle sensors serve to characterize particles, for example to determine a particle position, a particle speed, a particle acceleration, a particle trajectory, and/or a particle size. Characterizing particles is very relevant in many fields, for example in the chemical industry, pharmaceutical industry, or semiconductor industry.

Particle sensors based on optical measurement methods, in particular using laser radiation, find widespread use in the monitoring of the purity of air and liquids. However, the accuracy of such particle sensors is impaired as soon as contaminations accumulate on surfaces in the optical path of the laser beam or there are changes in the parameters of the light beam or in the laser parameters. This requires a complicated recalibration of the system, which cannot always be carried out during use in the field.

U.S. Pat. No. 3,885,415 has described a calibration apparatus for automatically calibrating an analysis system for measuring particle speeds. The calibration apparatus comprises a plate which, on its surface, has contrast regions for the purpose of modulating the light intensity. The contrast regions are moved in order to simulate the movement of particles which are introduced into a measurement cell during the measurement operation of the analysis system. The plate or the contrast regions can be introduced into an observation beam path of the analysis system for the purpose of calibrating the analysis system. The plate defines a calibration plane arranged in the vicinity of a surface on which an image of the particles is generated.

SUMMARY

Embodiments of the present invention provide a method for calibrating a particle sensor. The method includes focusing a laser beam on a calibration plane for generating a calibration intensity distribution in the calibration plane. A calibration plate is arranged in the calibration plane. Contrast regions for modulating an intensity of the laser beam are formed on the calibration plate. The method further includes moving the calibration plate and/or the calibration intensity distribution in the calibration plane, recording at least one intensity signal of the laser beam, following passage through the calibration plane, and calibrating the particle sensor by evaluating the at least one intensity signal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
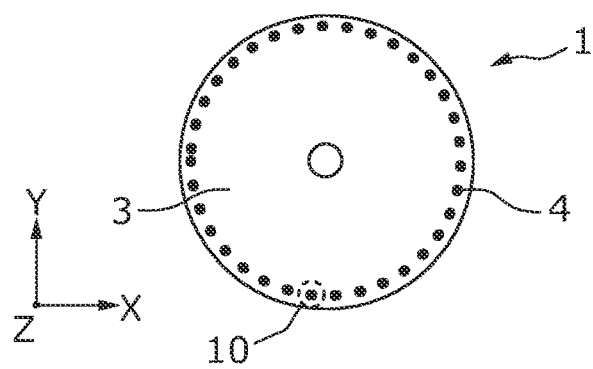
FIGS. 1a and 1b show schematic illustrations of a calibration plate serving to calibrate a particle sensor and designed for rotation or displacement in a calibration plane according to an embodiment.

Embodiments of the present invention provide a method, a particle sensor, and an apparatus having a particle sensor, which enable accurate calibration of the particle sensor.

According to some embodiments, a method for calibrating a particle sensor, comprising: directing, in particular focusing, a light beam, in particular a laser beam, on a calibration plane for the purpose of generating a calibration intensity distribution, in particular a calibration focus, in the calibration plane, a calibration plate being arranged in the calibration plane and having formed thereon contrast regions for modulating the intensity of the light beam, in particular of the laser beam, moving the calibration plate and/or the calibration intensity distribution in the calibration plane, recording at least one intensity signal of the light beam, in particular of the laser beam, following the passage through the calibration plane, and calibrating the particle sensor by evaluating the at least one intensity signal, typically with (known) properties of the contrast regions being taken into account.

In the method according to embodiments of the invention, contrast regions on a calibration plate are used for the purpose of calibrating the particle sensor, with the contrast regions having known properties, for example a known dimension or a known diameter. The contrast regions serve to simulate particles or form calibration particles, which are detected by the particle sensor during calibration operation and which differ in terms of at least one (optical) property from the surroundings of the contrast regions on the calibration plate. By way of example, the surroundings of the contrast regions can be formed by the substrate of the calibration plate. The light beam or laser beam can be at least partially scattered, absorbed, diffracted or reflected, for example, by the contrast regions. The surroundings of the contrast regions, for example in the form of the substrate, differ as substantially as possible from the optical properties of the contrast regions and can for example transmit the light beam or laser beam (virtually in full). A substantial difference between the contrast regions and the surroundings also arises, for example, if the contrast regions reflect the light beam or laser beam while the surroundings of the contrast regions absorb the light beam or laser beam.

The calibration exploits that the contrast regions have known properties, for example a known size/area or geometry, and known optical properties in respect of absorption, reflectivity, scattering behavior, etc. The movement of the calibration plate or calibration intensity distribution in the calibration plane is also specified during the calibration and therefore known. By moving the calibration plate or calibration intensity distribution, it is therefore possible to move a calibration particle with known properties along a known trajectory. Therefore, the particle sensor can be calibrated, for example, in respect of the measurement variables of particle size, particle material, particle trajectory, particle speed, particle acceleration, etc.

Within the meaning of this application, a calibration of the particle sensor is also understood to mean a checking of an already existing calibration of the particle sensor. Should the existing calibration transpire as being incorrect during the check, as may be able to be traced back to, e.g., a contamination of surfaces in the beam path of the light beam or laser beam or a change in the parameters of the light beam or laser beam (see above), it is possible to carry out a recalibration of the particle sensor.

The particle sensor characterizes the calibration particle in the same way as a particle that passes through a measurement volume of the particle sensor; that is to say, the calibration plate simulates a passage of a particle through the particle sensor. If the light beam or laser beam is incident on a calibration particle or a contrast region during the movement of the calibration plate or calibration intensity distribution, then this typically brings about an attenuation of the recorded intensity signal. Typically, the attenuation of the intensity signal increases as the area of the calibration particle increases. In particular, the attenuation of the intensity signal may be proportional to the area of the calibration particle.

The light beam or laser beam is directed on the calibration plane. The light beam or laser beam generating the calibration intensity distribution in the calibration plane can be a collimated light beam or collimated laser beam, for example. In the case where particles with a comparatively small particle diameter should be characterized, it is advantageous to focus the light beam or laser beam into the calibration plane. In this case, the calibration intensity distribution forms a calibration focus in the calibration plane.

The above-described calibration method can be used in a multiplicity of particle sensors which operate on the basis of optical radiation, in particular laser radiation. By way of example, the calibration method can be used for a sensor arrangement or for a particle sensor as described in DE 10 2019 209 213.6, the latter document being incorporated in the content of this application in its entirety by reference. In the case of the particle sensor described therein, a mode conversion device is used to generate a field distribution of the laser beam which has a different combination of local intensity and local polarization direction of the laser beam at each position of the field distribution. An analyzer optical unit serves to ascertain polarization-dependent intensity signals of the field distribution of the laser beam which has passed through a measurement region. The particles are characterized on the basis of the polarization-dependent intensity signals, wherein the fact that the field distribution or optical modes of the field distribution have a unique correlation between the local intensity distribution and the local polarization direction is exploited. However, it is understood that other types of particle sensors based on optical radiation, for example laser radiation, or the attenuation of optical radiation, for example laser radiation, on passing through a measurement volume, may also be calibrated with the aid of the calibration method described herein.

In a variant, the calibration plate is arranged in a calibration plane within a measurement volume through which the particles pass during the measurement operation of the particle sensor. In this variant, the calibration plate is introduced from the outside into the measurement volume through which the particles flow during the measurement operation. In this case, the calibration is implemented outside of the measurement operation, in order to calibrate the particle sensor prior to being put into operation or during servicing. This variant requires the measurement volume to be accessible from the outside for the purpose of positioning the calibration plate; this is not possible in every case.

In an alternative variant, the calibration intensity distribution, in particular a calibration focus, in the calibration plane and a measurement intensity distribution, in particular a measurement focus, in a measurement plane are imaged onto one another. The measurement plane is formed in a measurement volume through which the particles pass during the measurement operation of the particle sensor. In this case, the calibration plate is not introduced into the measurement volume but is arranged at a distance from the measurement volume in the beam path of the light beam or laser beam. The light beam or laser beam can be focused into the measurement plane such that the measurement intensity distribution forms a measurement focus; however, this is not mandatory. Imaging the calibration intensity distribution or calibration focus and the measurement intensity distribution or measurement focus onto one another can be implemented with the aid of a beam-shaping device in the form of an imaging optical unit. The imaging optical unit generates an intensity distribution or double focus with comparable beam parameters (beam radius, etc.). By way of example, the calibration plate can be introduced at one of the two foci (calibration focus) while the second focus (measurement focus) is situated in the measurement volume through which the particles to be characterized flow. Knowledge of the beam radii of the calibration intensity distribution or calibration focus and of the measurement intensity distribution or measurement focus allows a calculation of the size of the particles in the measurement volume following the calibration with the aid of the calibration particles or contrast regions of the calibration plate. The particle size of a particle is understood to mean the cross-sectional area of a particle in the measurement plane.

In this variant, the calibration plate can be integrated in the particle sensor, and so the calibration can be checked and repeated during the use of the particle sensor in the field. The calibration plate is not moved during the measurement operation of the particle sensor and either removed from the beam path of the light beam or laser beam or positioned in such a way that the attenuation of the light beam or laser beam is not too pronounced. By way of example, the calibration plate can be positioned so that the light beam or laser beam passes through the calibration plate in a transparent region of the substrate where no contrast region is formed.

Not only does the measurement intensity distribution or measurement focus in the measurement plane form a type of "virtual sensor surface", which enables a remote characterization of the particles without needing to position the sensor at the location of the particles, in this variant, but the calibration intensity distribution or calibration focus in the calibration plane also enables a calibration without the calibration particles being introduced into the measurement plane or into the measurement volume. Consequently, a remote diagnosis or remote calibration of the particle sensor is enabled in this variant.

In a development of this variant, the calibration plate is arranged in a housing that is separated from the measurement volume. It is advantageous to arrange the calibration plate in a volume that is hermetically separated from the measurement volume in order to protect the calibration plate from contamination by the particles that flow through the measurement volume.

In a further variant, the contrast regions on the calibration plate have different surface areas. The different surface areas or sizes of the contrast regions simulate calibration particles with different particle sizes or particle diameters known in advance. The size of the contrast regions is adapted to match the type of particles to be characterized or the type of particle sensor. The calibration with contrast regions or calibration particles of different sizes on the calibration plate enables a great accuracy during the subsequent particle measurement over a large range of sizes.

In a further variant, the contrast regions are formed by microstructures on the surface of a substrate, in particular of a wafer. In this case, the calibration plate may have a substrate, for example made of glass or a crystal, on which contrast regions in the form of microstructures with known structure dimensions are formed, and these contrast regions act like calibration particles. The microstructures may be applied, for example by microlithography, to the surface of a transparent substrate, for example in the form of a glass wafer. The contrast regions may form structures that at least partially absorb or reflect or scatter the light beam or laser beam. Both the shape and the size or surface area of the contrast regions are known with great precision as a result of the microstructuring, and so these contrast regions can be used as a calibration standard. The microstructuring can be implemented on a layer, for example a metal layer, which has been applied to the substrate; however, it is also possible for the substrate itself to be microstructured. For the purpose of comparing the sizes of the contrast regions generated by the microstructuring, the calibration which is carried out with the aid of the calibration plate can optionally be verified with the aid of standard particles of a defined size, for example with the aid of polystyrene spheres of a known size.

In an alternative variant, the contrast regions are formed by calibration particles, in particular with a specified particle size, the calibration particles preferably including at least two groups of calibration particles with different optical properties and the calibration particles of the at least two groups being formed from different materials in particular. By way of example, the different optical properties can be a different (complex) refractive index, which leads to the calibration particles absorbing, reflecting, scattering, and/or diffracting the light or the laser radiation differently. The use of calibration particles formed from different materials allows the calibration of the particle sensor to be carried out for the detection of particles of different materials or material classes without different calibration plates being needed to this end.

The materials from which the calibration particles of a respective group are formed can be, for example, metals (e.g., steel), sand (e.g., SiO2), plastic (e.g., polystyrene or latex), ceramics, etc., since these materials typically differ significantly in terms of their optical properties. The three material classes of metals, sand, and plastics are typical constituent parts of dusts.

In this case, the calibration particles may have been applied to the calibration plate for example with a specified distribution or a specified pattern (or in specified surface regions or fields), but the calibration particles of the different groups may optionally also have been applied with a statistical distribution (see below). Naturally, it is also possible to apply only one type of calibration particles, optionally with different specified particle sizes, to the calibration plate.

In a development of this variant, the calibration particles are applied to the surface of a substrate with a statistical distribution and/or the calibration particles are formed on the surface of the substrate by self-structuring.

Although the size of the calibration particles is known in the first case, the exact distribution on the surface is not known in advance; rather, the calibration particles are distributed statistically during the application to the surface. In this case, the calibration particles, that is to say particles of a known size, can for example be suspended at a low concentration in a liquid, transparent adhesive and can be applied to the calibration plate or the substrate as a thin layer. Once the adhesive has dried, the calibration particles are statistically distributed over the calibration plate. In particular, spherical, monodisperse particles of a known size are suitable calibration particles for this variant, for example polystyrene latex balls which have become established as the standard for particle size measurement and which are available with a narrow size distribution. By way of example, such calibration particles are used for calibrating particle counters pursuant to the ISO 21501 standard; cf. the link "de.wikipedia.org/wiki/ISO_21501".

In the second case, the adhesive or a photoresist is applied to the plate-shaped substrate by means of a dispenser. Prior to curing (specifically using UV light or in the oven), this photoresist or adhesive shapes spherical segments up to hemispheres as a result of the surface tension, depending on the viscosity of said photoresist or adhesive. The three-dimensional structure of the calibration particles generated in this way, that is to say by self-structuring, enables the approximation of the scattering behavior of particles with spherical surfaces and is therefore suitable, in particular, for particle sensors that are based on the principle of scattered light measurement. The structure size of the calibration particles generated in this way depends on the process parameters, inter alia when curing the photoresist or adhesive, and can therefore be assumed as known for given process parameters. The plate-shaped substrate can additionally be cleaned, coated, or laser-structured prior to the application of the adhesive, and so a hydrophilic or hydrophobic surface arises for the adapted shaping of the droplets.

In a further variant, the calibration plate is rotated in automated fashion and/or displaced in automated fashion within the scope of the movement in the calibration plane.

The calibration plate can be turned or rotated about a given axis of rotation for the purpose of being moved in the calibration plane and for the purpose of simulating the movement of a particle. By way of example, the automated rotation of the calibration plate can be implemented with the aid of an electric motor. In the case of a calibration plate that is suitably dimensioned in terms of its diameter, the calibration particles move approximately in a straight line through the light beam or laser beam of the particle sensor here and bring about an attenuation of the intensity of the light beam or laser beam which is generally proportional to the area of the contrast region or calibration particle. In this case, the calibration plate is typically designed to be circular and may have a diameter of between 10 mm and 100 mm, for example. By way of example, the calibration plate can be rotated at a frequency of between 0.1 Hz and 200 Hz. By way of example, between 1 and 400 calibration particles per rotation can be applied to the calibration plate. By way of example, the calibration particles may be round and applied by way of a lithographic method. The light beam or laser beam may have, for example, a diameter between 20 µm and 200 µm at the calibration intensity distribution or calibration focus. The diameters of the calibration particles are typically between 0.05% and 100% of the focus diameter or beam diameter.

The calibration plate can also be displaced in a straight line within the calibration plane. In this case, a piezo drive or a piezo crystal or a linear drive, for example, can be used for the automated displacement. The use of a piezo drive for displacing the calibration plate was found to be advantageous since the latter operates without wear and therefore does not generate any measurement errors as a result of abrasion products, which could otherwise accumulate on the calibration plate. By way of example, the frequency of the displacement of the calibration plate can be of the order of between 1 Hz and 100 Hz. In this case, the calibration plate may have a rectangular geometry, for example.

Alternatively or additionally, the calibration intensity distribution or calibration focus of the light beam or laser beam can also be moved in the calibration plane. To move the calibration intensity distribution, the light beam or laser beam may carry out a scanning movement, for example by virtue of the latter being deflected with the aid of mirror scanners or scanner mirrors, with the aid of an acousto-optic modulator, etc., for the purpose of varying the position of the calibration intensity distribution in the focal plane. In this case, the calibration plate may be arranged in stationary fashion, but this is not mandatory; that is to say, there can also be a superposed movement of the calibration plate and the calibration intensity distribution.

A further aspect of the invention relates to a particle sensor comprising: an emitter which has a light source for generating a light beam, in particular a laser source for generating a laser beam, an optical unit for directing, in particular focusing, the light beam, in particular the laser beam, on a calibration plane for the purpose of generating a calibration intensity distribution, in particular a calibration focus, in the calibration plane, a calibration plate being arranged in the calibration plane, a movement device for moving the calibration plate and/or the calibration intensity distribution in the calibration plane, a receiver which comprises a detector for recording at least one intensity signal of the light beam, in particular of the laser beam, following the passage through the calibration plane, and an evaluation device for evaluating the at least one intensity signal for the purpose of calibrating the particle sensor during a calibration operation of the particle sensor.

As described further above in the context of the method, the movement of particles is simulated with the aid of the contrast regions during the calibration operation of the particle sensor. If the size of the contrast regions or calibration particles is known, a calibration of the particle sensor can be carried out on the basis of the recorded intensity signal or signals. During the calibration, the respective recorded intensity signals can be stored as characteristic for a certain particle size or for certain particle speeds and/or particle trajectories, and can serve as a calibration standard. During the measurement operation of the particle sensor, this calibration standard can be used to characterize particles that pass through a measurement volume.

In the case of the particle sensor described here, the characterization of the particles can be implemented in transmission, that is to say the light beam or laser beam is emitted by the emitter and passes through the measurement volume in transmission. However, it is also possible for the particle sensor to undertake a characterization of the particles as a result of scattering and/or absorption of the light beam or laser beam on the particles. In the two cases mentioned last, the reflected or scattered light beam or laser beam is detected at the detector of the receiver.

In an embodiment, the calibration plate is arranged in a calibration plane situated in a measurement volume through which the particles pass during a measurement operation of the particle sensor. As described further above, the calibration plate in this case is typically arranged in the measurement volume only during the calibration operation. During the measurement operation of the particle sensor, the calibration plate is removed from the measurement volume, in either automated or manual fashion.

In an alternative embodiment, the optical unit of the particle sensor comprises an imaging optical unit for imaging the calibration intensity distribution in the calibration plane and a measurement intensity distribution, in particular a measurement focus, in a measurement plane onto one another, with the measurement plane being formed in a measurement volume through which the particles pass during a measurement operation of the particle sensor. In this embodiment, the calibration plate is generally permanently integrated in the particle sensor, typically in the emitter of the particle sensor. In this case, the calibration plate can be introduced into the beam path of the light beam or laser beam in automated fashion, optionally before the calibration operation is started; however, it is also possible for the calibration plate to be permanently arranged in the beam path of the laser beam. In this case, the calibration plate is positioned in such a way that the latter interferes with the implementation of the measurement operation as little as possible. By way of example, in this case the position where the light beam or laser beam is incident on the calibration plate may be at a location where no contrast region is arranged.

In a further embodiment, the emitter has a housing with an exit window and the receiver has a housing with an entrance window, between which the measurement volume is formed. In this case, the calibration plate is typically arranged in the housing of the emitter or receiver, and hermetically separated from the measurement volume. This is advantageous for the prevention of a contamination of the calibration plate by the particles that pass through the measurement volume. The arrangement of the calibration plate in the receiver is preferable since the power of the light beam or laser beam may be reduced on account of a contamination of the entrance window or exit window. In this case, the calibration can be implemented with the already reduced power and with the possible optical interferences of the light beam or laser beam as a result of the dirt on the entrance window or exit window.

The calibration plate can be configured in the way formed above in the context of the method. By way of example, the contrast regions may have different surface areas. Additionally, the contrast regions can be designed to at least partially scatter, absorb, or reflect the light beam or laser beam. The contrast regions on the calibration plate can be formed by microstructuring. It is also possible that the contrast regions are formed by calibration particles with a specified particle size, which are optionally applied with a statistical distribution to the surface of a substrate of the calibration plate, or that groups of calibration particles with different properties are provided on the calibration plate.

In a further embodiment, the movement device is designed to rotate the calibration plate in the calibration plane. In this case, the movement device may be designed as an electric motor, for example, which engages with a rotary shaft to which the calibration plate is fastened.

In a further embodiment, the movement device is designed to displace the calibration plate in the calibration plane. In this case, the movement device may be designed as a piezo-actuator, for example, which engages with a lateral edge of the calibration plate, for example, in order to displace the latter in the calibration plane. The piezo-actuator allows a non-abrasive movement of the calibration plate in the calibration plane.

A further aspect of the invention relates to an apparatus, in particular an EUV radiation generating apparatus, comprising: a measurement chamber, with particles being suppliable thereto, for example to a target region, and a particle sensor designed as described further above for characterizing the particles in the measurement chamber.

As described further above, the particle sensor can be used in a multiplicity of fields of application, for the purpose of characterizing solid, liquid, or gaseous particles or particle streams. By way of example, the measurement chamber may be designed to receive a gas or liquid or to allow said gas or liquid to pass therethrough. In the first case, the apparatus may serve for example to measure air purity, for example for characterizing soot particles or for a particulate matter measurement. The characterization of powders is also possible, for example in view of their powder or grain size distribution, for example in the case of powders used for additive manufacturing (3D printing) or in the case of construction materials, for example cement. The characterization of particles in liquids is also possible, for example the characterization of particles in the form of bacteria in milk. Machine learning can be used in all these applications or apparatuses, for the purpose of characterizing the particles or carrying out the calibration. In the case of machine learning, test data are generated and a suitable AI, for example in the form of a neural network or the like, is trained.

The particle sensor can also be used in the semiconductor industry. By way of example, the particle sensor can be used to characterize particles or particle streams in a measurement chamber in the form of a vacuum chamber of an EUV radiation generating apparatus. As a rule, such an EUV radiation generating apparatus has a driver laser arrangement for generating a driver laser beam and a beam supply device for supplying the driver laser beam to the above-described vacuum chamber. The driver laser beam is focused in a target region of the vacuum chamber, into which a target material in the form of tin particles or tin droplets has been introduced or supplied. A respective particle transitions into a plasma state upon irradiation with the driver laser beam and emits EUV radiation in the process. The particles of the target material which are guided to the target region and the particles generated upon the incidence of the laser beam on the target material (in the case of vaporization of the target material) can be characterized with the aid of the above-described particle sensor.

Further advantages of the embodiments of the invention are evident from the description and the drawing. Likewise, the features mentioned above and those that are yet to be presented can be used in each case by themselves or as a plurality in any desired combinations. The embodiments shown and described should not be understood as an exhaustive list, but rather are of an exemplary character for outlining embodiments of the invention.

In the following description of the drawings, identical reference signs are used for identical or functionally identical components.

Figure 1B:
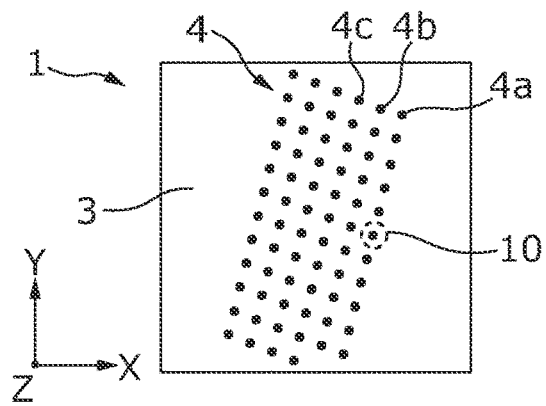
Figure 2A:
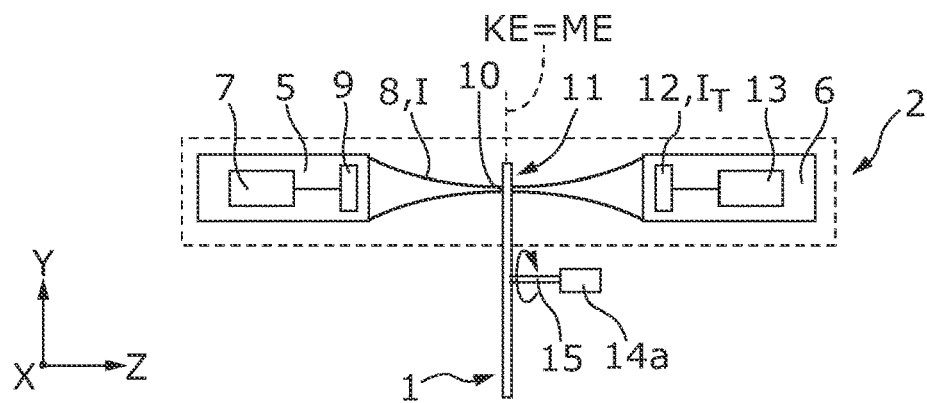
FIGS. 2a and 2b show schematic illustrations of the calibration plate of FIGS. 1a and 1b, which is arranged in a calibration plane in a measurement volume of the particle sensor according to an embodiment.
Figure 3:
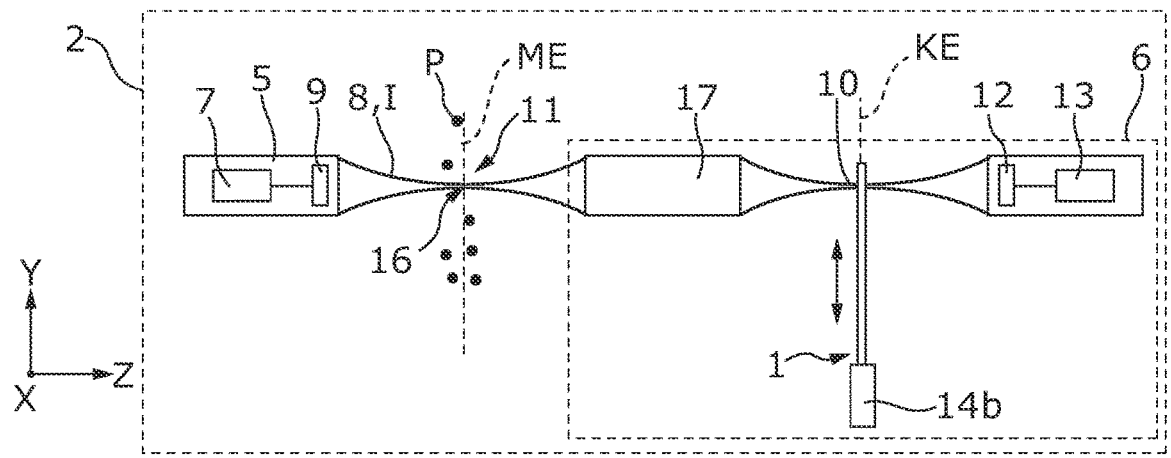
FIG. 3 shows a schematic illustration of a particle sensor having an imaging optical unit for imaging a calibration focus in a calibration plane and a measurement focus in a measurement plane onto one another, the measurement plane being formed in a measurement volume of the particle sensor, according to an embodiment.

FIG. 1a and FIG. 1b each show a calibration plate 1 for calibrating a particle sensor 2, which is depicted in FIG. 2a,b and in FIG. 3. The calibration plate 1 has a transparent substrate 3 in the form of a crystal wafer, glass wafer, or plastic plate. In the example shown, circular contrast regions 4 are formed on the substrate 3, more precisely on a plane surface of the substrate 3. The contrast regions 4 have a size and geometry known in advance and serve as calibration particles for calibrating the particle sensor 2.

The particle sensor 2 shown in FIG. 2a,b or in FIG. 3 has an emitter 5 and a receiver 6. The emitter 5 comprises a laser source 7 which serves to generate a laser beam 8. A different type of light source which generates a light beam or optical radiation that is not laser radiation may optionally be used instead of a laser source 7. By way of example, the light source can be an LED or the like.

In the example shown, the laser source 7 is a diode laser which has a laser wavelength which is selected from a wavelength range between approx. 250 nm and approx. 1600 nm, depending on the application. With the aid of an optical unit in the form of a focusing optical unit 9, the laser beam 8 is focused onto a calibration focus 10 in a calibration plane KE, in which the calibration plate 2 is arranged. The calibration focus 10 forms a calibration intensity distribution in the calibration plane KE. When passing through the calibration plate 1, more precisely the contrast regions 4, the laser beam 8 is incident on the contrast regions 4 and is modulated in terms of its intensity I. The modulation of the intensity I can be realized, for example, by a transparency of the contrast regions 4 that is reduced vis-à-vis the substrate 3, by a refractive index of the contrast regions 4 that is modified vis-à-vis the substrate 3.

In the example shown in FIG. 1a, the contrast regions 4 are formed from a material that absorbs the laser beam 8 while the substrate 3 of the calibration plate 1 is formed from a material that is transparent to the wavelength of the laser beam 8. If the laser beam 8 is incident on a respective contrast region 4, then the intensity I of the laser beam 8 reduces during the passage through the calibration plate 1.

The calibration plate 1 shown in FIG. 1a or the calibration plane KE is arranged in a measurement volume 11 of the particle sensor 2 shown in FIG. 2a. The receiver 6 of the particle sensor 2 in FIG. 2a is arranged along the propagation direction Z (Z-direction of an XYZ-coordinate system) along a line of sight to the laser source 7 or receiver 6 and has a detector 12, which serves to record an intensity signal IT of the laser beam 8 transmitted by the calibration plate 1. An evaluation device 13 serves to evaluate the intensity signal IT of the laser beam 8.

In contrast to the calibration plate 1 shown in FIG. 1a or FIG. 1b, the contrast regions 4 are formed from a material that reflects the wavelength of the laser beam 8. The calibration plate 1 shown in FIG. 1b is arranged in a calibration plane KE of the particle sensor 2 shown in FIG. 2b, the latter substantially differing from the particle sensor 2 shown in FIG. 2a in that the receiver 6 is arranged at an angle to the propagation direction of the laser beam 8 generated by the laser source 7, with the result that the detector 12 detects an intensity signal IR of the laser beam 8 that has been reflected at the contrast regions 4. It is also possible that the detector 12 of the particle sensor 2 in FIG. 2b serves to detect scattered radiation of the laser beam 8 scattered at the contrast regions 4.

The focusing of the laser beam 8 in the calibration plane KE shown in FIG. 1a,b serves to generate a small beam diameter of the laser beam 8 in the calibration plane KE. Focusing may optionally be dispensed with if comparatively large particles are intended to be detected by the particle sensor 2. In this case, the laser beam 8 may optionally be collimated or even radiated divergently onto the calibration plane KE. In this case, a different type of optical unit, for example a collimating optical unit, is used instead of the focusing optical unit 9.

The contrast regions 4 are formed as microstructures in the example shown in FIG. 1a in order to form the most accurate calibration standard possible for the calibration of the particle sensor 2. The microstructures are formed by the microlithographic structuring of a metal layer which was applied to the surface of the substrate 3 and which, with the exception of the circular contrast regions 4, was removed again from the surface of the calibration plate 1 during the microstructuring. The microstructuring allows precise specification of the size of the contrast regions 4 or calibration particles and the spacings thereof, in order to increase the precision when calibrating the particle sensor 2. In the example shown, the contrast regions 4 have surface regions of different sizes or diameters of different sizes in order to simulate particles of different sizes, and thus enable the accuracy of the particle sensor 2 for different particle sizes, in particular over a broad size range. As an alternative to the production of the contrast regions 4 by microstructuring, these may also be formed by ultrashort pulse machining, etc., on the calibration plate 1.

In the example shown in FIG. 1b, the contrast regions are formed by calibration particles 4 which have been applied to the surface of the substrate 3 with a specified distribution (in an array). The calibration particles 4 in adjacent columns of the array-type arrangement differ from one another in terms of their optical properties, specifically their (complex) refractive index in the example shown; that is to say, these form different groups of calibration particles 4. In FIG. 1b, the groups of calibration particles 4 are formed from different materials. By way of example, FIG. 1b shows a first group 4a of calibration particles 4 which is formed from a metallic material, more precisely steel, a second group 4b of calibration particles 4 which is formed from sand (SiO2), and a third group 4c of calibration particles 4 which is formed from a plastic (e.g., polystyrene or latex). As a result of the different materials of the calibration particles 4, the particle sensor 2 can be calibrated for the characterization of particles made of different particle materials.

It is likewise possible for the contrast regions 4 on the calibration plate 1 to be formed by calibration particles which are applied to the surface of the substrate 3 with a statistical distribution. In this case, the contrast regions 4 are calibration particles, that is to say particles with a known size. To apply the calibration particles 4, the latter can for example be suspended at a low concentration in a liquid, transparent adhesive and can be applied to the calibration plate 1 or the substrate 3 as a thin layer. Once the adhesive has dried, the calibration particles 4 are statistically distributed over the calibration plate 1. In particular, spherical, monodisperse particles of a known size, for example polystyrene latex balls, lend themselves in this case as calibration particles 4.

The adhesive or a photoresist can also be applied to the plate-shaped substrate 3 by means of a dispenser. Prior to curing (specifically using UV light or in the oven), this photoresist or adhesive shapes spherical segments up to hemispheres, which form the calibration particles 4, as a result of the surface tension, depending on the viscosity of said photoresist or adhesive. The three-dimensional structure of the calibration particles 4 generated in this way enables the approximation of the scattering behavior of particles with spherical surfaces and is therefore suitable, in particular, for a particle sensor 2 that is based on the principle of scattered light measurement. The structure size of the calibration particles 4 generated in this way depends on the process parameters, inter alia when curing the photoresist or adhesive, and can therefore be assumed as known for given process parameters. The plate-shaped substrate 3 can additionally be cleaned, coated, or laser-structured prior to the application of the adhesive, and so a hydrophilic or hydrophobic surface arises for the adapted shaping of the droplets.

The particle sensor 2 in FIG. 2a,b and in FIG. 3 also has a movement device 14a, 14b, to move the calibration plate 1 in the calibration plane KE during the calibration. In the particle sensor 2 shown in FIG. 2a, the movement device 14a is an electric motor with a motor hub 15, which serves as a rotary shaft for the calibration plate 1 of FIG. 1a. The circular calibration plate 1 shown in FIG. 1a is rotatably mounted and has a central bore, in which the motor hub 15 of the electric motor 14a engages.

For the calibration of the particle sensor 2, the calibration plate 1 in FIG. 1a is put into rotation with the aid of the electric motor 14a, with the contrast regions 4 moving almost in a straight line through the calibration focus 10. The calibration plate 1 of FIG. 1a has a diameter which may be in the range between approx. 10 mm and approx. 100 mm. In the case of a rotation of the calibration plate 1, it is optionally possible for only a single contrast region 4 to be passed through. As a rule, however, a plurality of contrast regions 4 are arranged distributed over the calibration plate 1 in the circumferential direction; in particular, it is possible for several hundred contrast regions 4 to be applied to the calibration plate 1 and pass through the calibration focus 10 during one rotation of the calibration plate 1. By way of example, the calibration plate 1 can be rotated at a frequency of between 0.1 Hz and 200 Hz. A typical order of magnitude for the diameter of the laser beam 8 at the calibration focus 10 is between approx. 10 μm and approx. 5 mm, for example between approx. 40 μm and approx. 100 μm.

Figure 2B:
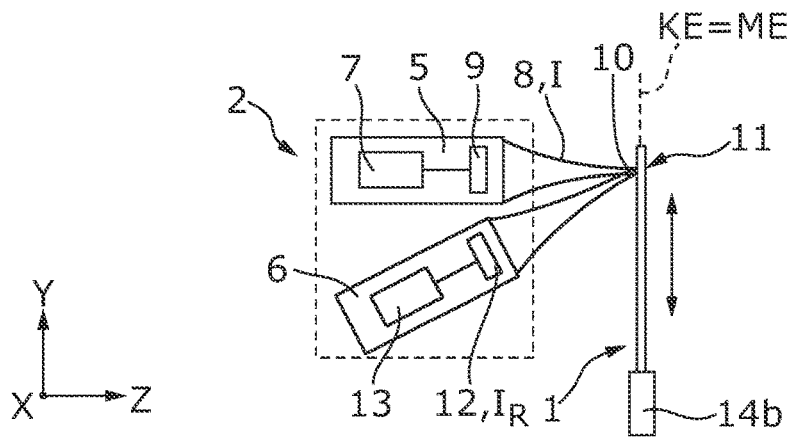

In the case of the example shown in FIG. 2b, the movement device 14b is a piezo-actuator which engages on a lateral edge of the calibration plate 1 in FIG. 1b, in order to displace the latter along a displacement direction Y in the calibration plane KE. To simplify the displacement in the calibration plane KE, the calibration plate 1 in FIG. 2b has a rectangular geometry. It is also possible to simulate a particle trajectory of the contrast regions 4 or calibration particles during the displacement of the calibration plate 1 in the calibration plane KE. The piezo-actuator 14a can displace the calibration plate 1 in the calibration plane KE, for example at an (adjustable) frequency between 1 Hz and 100 Hz, and can deflect the calibration particles or contrast regions 4 in the process. The movement can be implemented in particular in targeted fashion within a certain group 4a-c of calibration particles 4 or along a certain column of the array-type pattern on the calibration plate 1.

As an alternative or in addition to the movement of the calibration plate 1 in the calibration plane KE, the calibration focus 10 can also be moved in the calibration plane KE. To this end, the emitter 5 may have a movement device, for example in the form of a scanner device, which comprises one or more scanner mirrors, an acousto-optic modulator, a polygon mirror, etc., for moving the laser beam 8 and hence also the calibration focus 10 in the calibration plane KE.

In the case of the particle sensor 2 shown in FIG. 2a,b, the calibration plate KE is arranged in the measurement volume 11, through which particles pass during the measurement operation, outside of said measurement operation. To this end, the calibration plate KE can be introduced into the measurement volume 11 in automated fashion or optionally manually.

In the case of the particle sensor 2 shown in FIG. 3, the calibration can be implemented during running operation (in the measurement operation). In contrast to the particle sensor 2 shown in FIG. 2a,b, the calibration plane KE of the particle sensor 2 shown in FIG. 3 is not arranged within the measurement volume 11 through which the particles P to be characterized pass during the measurement operation; instead, in the example shown, said plane is spaced apart in the beam direction of the laser beam 8 from a measurement plane ME formed in the measurement volume 11. To image the calibration focus 10 in the calibration plane KE and a measurement intensity distribution in the form of a measurement focus 16 in the measurement plane ME onto one another, the particle sensor 2, more precisely the receiver 6 of the particle sensor 2, has an imaging optical unit 17. The imaging optical unit 17 serves to generate a double focus with comparable beam parameters (beam radius, etc.) in the calibration plane KE and in the measurement plane ME, respectively. To this end, the imaging optical unit 17 may for example comprise a collimation device and a focusing device, which may be in the form of lenses or (curved) mirrors, for example.

In the case of the particle sensor 2 shown in FIG. 3, a focusing optical unit 9 of the emitter 5 serves to focus the laser beam 8 onto the measurement focus 16 in the measurement plane ME. In principle, it is possible to interchange the role of the calibration plane KE and the measurement plane ME in the case of the particle sensor 2 depicted in FIG. 3. In this case, the focusing optical unit 9 serves to focus the laser beam 8 onto a calibration focus 10 in the calibration plane KE. In this case, the calibration plate 1 is arranged in the emitter 5 and not in the receiver 6; however, this was found to be rather disadvantageous for the calibration of the particle sensor 2.

In principle, it is possible for the calibration plate 1 to remain permanently in the beam path of the laser beam 8 in order to enable a calibration during the running measurement operation. This is advantageous if the measurement (e.g., for agglutination in a fluid) should not be interrupted, and so a 100% test can be carried out. In this case, the particles P that pass through the measurement volume 11 must be distinguished from the calibration particles 4 during the running measurement. By way of example, this is possible if the calibration particles 4 differ from the particles P in the measurement volume 11 in terms of at least one optical property. Such a distinction is also possible in the case of the same optical properties, provided that particles P in the measurement volume 11 do not coincide too frequently with particles on the calibration plate 1 and provided that the arrangement of the calibration particles 4 on the calibration plate 1 is known. The pattern in which the calibration particles 4 are arranged on the calibration plate 1 can be specifically chosen in such a way that the sequence of intensity signals over time caused by the calibration particles 4 can be distinguished within the scope of the evaluation in the evaluation device 13 from the intensity signals of the particles P to be measured.

Alternatively, the calibration plate 1 can be introduced into the beam path of the laser beam 8 in automated fashion for the purpose of carrying out the calibration, and the calibration plate can be removed from the beam path of the laser beam again as soon as the calibration has been completed. The movement device 14b can be used to introduce and remove the calibration plate 1 into and from the beam path, respectively; however, it is also possible that a further movement device is provided for this purpose in the emitter 5.

The size of the particles P in the measurement volume 11 can be calculated post calibration with knowledge of the beam radii of the laser beam 8 of the calibration intensity distribution or calibration focus 10 and of the measurement intensity distribution or measurement focus 16. It is understood that a calibration of other measurement variables of the particles P can also be carried out in addition to the size of the particles P. By way of example, these measurement variables can be the particle position, the particle speed, etc. The calibration of these measurement variables is possible because the calibration plate 1 is moved in the calibration plane KE with the aid of the respective movement device 14a, 14b.

The characterization of the particles P (and of the calibration particles 4) is carried out in the evaluation device 13 of the receiver 6 of the particle sensor 2. The detector 12 for recording the intensity signals IT, IR of the laser beam 8 can be a spatially resolving detector, for example a CCD detector, but this is not mandatory. By way of example, the detector 12 can be designed to record a plurality of polarization-dependent intensity signals without spatial resolution, which intensity signals enable the characterization of the particles P, as described in the patent application DE 10 2019 209 213.6 cited above. In this case, the detector 12 may have a plurality of photodiodes, for example.

The particle sensor 2 described in conjunction with FIG. 2a,b and FIG. 3 can be used to characterize particles P in a multiplicity of different applications. One such application is described in more detail below on the basis of an EUV radiation generating apparatus 30, the description being exemplary on the basis of FIG. 4. The EUV radiation generating apparatus 30 comprises a beam source 31, an amplifier arrangement 32 having three optical amplifiers or amplifier stages 33a-c, a beam guiding device 34 not depicted in any more detail, and a focusing device 35. The focusing device 35 serves to focus a driver laser beam 31a, which was generated by the beam source 31 and amplified by the amplifier arrangement 32, onto a target region 36 in a vacuum chamber 38 into which particles P have been introduced. The particles P or an individual tin droplet serve(s) as a target material and are/is irradiated by means of the driver laser beam 31a. In the process, the tin droplet transitions into a plasma state and emits EUV radiation, which is focused by means of a collector mirror 37. In the example shown in FIG. 4, the collector mirror 37 has an opening for the passage of the laser beam 31a. In the example shown, the beam source 31 has two CO2 lasers for producing a pre-pulse and a main pulse which together are amplified in the amplifier arrangement 32 and focused on the target region 36. The beam source 31 forms together with the amplifier arrangement 32 a driver laser arrangement 39 of the EUV radiation generating apparatus 30.

Figure 4:
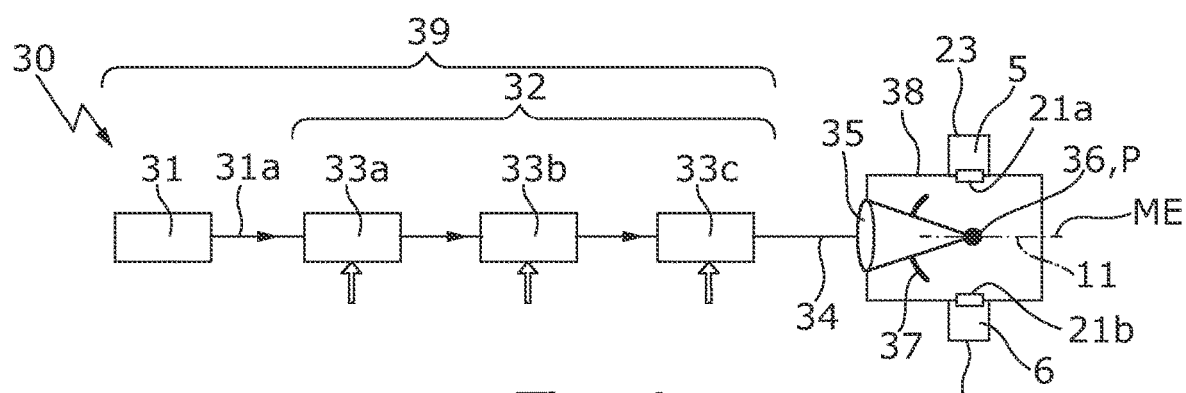
FIG. 4 shows a schematic illustration of an EUV radiation generating apparatus having a particle sensors for characterizing particles in a vacuum chamber, according to an embodiment.

As may likewise be seen in FIG. 4, the emitter 5 and the receiver 6 of the particle sensor 2 have been attached to the vacuum chamber 38, with the result that the vacuum chamber 38 forms a measurement chamber for the particle sensor 2. The measurement volume 11, in which the measurement plane ME is formed, passes through the target region 36 with the particles P in the form of tin droplets. With the aid of the particle sensor 2, it is possible to examine the particles P or their movement toward the target region 36, and their movement or trajectory can be determined. The size of the particles P or the size of smaller particles generated during the vaporization of a respective tin droplet by way of the driver laser beam 31a can also be determined with the aid of the particle sensor 2. The trajectories or the speeds of the particles P generated during the vaporization can also be detected by means of the particle sensor 2.

As may likewise be seen in FIG. 4, the emitter 5 is shielded from the surroundings by way of a housing 23. Accordingly, the receiver 6 is also shielded from the surroundings by a housing 24. An exit window 21a is formed in the housing 23 of the emitter 2 and serves for the exit of the laser beam 8. Accordingly, an entrance window 21b for the entrance of the laser beam 8 into the receiver 6 following the passage through the measurement volume 11 is formed in the housing 24 of the receiver 6. The windows 21a,b allow the emitter 5 and the receiver 6 to be shielded from the surroundings, with the result that the particle sensor 2 can be used to detect different liquid, gaseous, or solid media. Consequently, in the case of the particle sensor 2 shown in FIG. 4, the calibration plate 1 is also shielded by the housing 23 of the emitter 5 from the measurement volume 11 and is consequently protected from the particles P that pass through the measurement volume 11.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for calibrating a particle sensor, the method comprising:
focusing a laser beam on a calibration plane for generating a calibration intensity distribution in the calibration plane, wherein a calibration plate is arranged in the calibration plane, and contrast regions for modulating an intensity of the laser beam are formed on the calibration plate, wherein the contrast regions are formed by calibration particles having known dimensions and known optical properties,
moving the calibration plate and/or the calibration intensity distribution in the calibration plane,
recording at least one intensity signal of the laser beam, following passage through the calibration plane, and
calibrating the particle sensor by evaluating the at least one intensity signal based on the known dimensions and the known optical properties of the calibration particles.

2. The method as claimed in claim 1, wherein the calibration plate is arranged in the calibration plane in a measurement volume through which particles pass during measurement operation of the particle sensor.

3. The method as claimed in claim 1, wherein the calibration intensity distribution in the calibration plane and a measurement intensity distribution in a measurement plane are imaged onto one another, with the measurement plane being arranged in a measurement volume through which the particles pass during the measurement operation of the particle sensor.

4. The method as claimed in claim 3, wherein the calibration plate is arranged in a housing that is separated from the measurement volume.

5. The method as claimed in claim 1, wherein the contrast regions on the calibration plate have different surface areas.

6. The method as claimed in claim 1, wherein the contrast regions are formed by microstructures on a surface of a substrate.

7. The method as claimed in claim 1, wherein the calibration particles include at least two groups of calibration particles with different optical properties, wherein the two groups of calibration particles are formed from different materials.

8. The method as claimed in claim 7, wherein the calibration particles are applied to a surface of a substrate with a statistical distribution, and/or wherein the calibration particles are formed on the surface of the substrate by self-structuring.

9. The method as claimed in claim 1, wherein moving the calibration plate comprises rotating the calibration plate in automated fashion and/or displacing the calibration plate in automated fashion.

10. A particle sensor, comprising:
an emitter comprising a laser source for generating a laser beam,
an optical unit for focusing the laser beam on a calibration plane for generating a calibration intensity distribution in the calibration plane,
a calibration plate arranged in the calibration plane, wherein contrast regions are formed on the calibration plate for modulating an intensity of laser beam, wherein the contrast regions are formed by calibration particles having known dimensions and known optical properties,
a movement device for moving the calibration plate and/or the calibration intensity distribution in the calibration plane,
a receiver comprising a detector for recording at least one intensity signal of the laser beam, following passage through the calibration plane, and
an evaluator for evaluating the at least one intensity signal for calibrating the particle sensor during a calibration operation of the particle sensor based on the known dimensions and the known optical properties of the calibration particles.

11. The particle sensor as claimed in claim 10, wherein the calibration plate is arranged in the calibration plane situated in a measurement volume through which particles pass during a measurement operation of the particle sensor.

12. The particle sensor as claimed in claim 10, wherein the optical unit comprises an imaging optical unit for imaging the calibration intensity distribution in the calibration plane and a measurement intensity distribution in a measurement plane onto one another, with the measurement plane being formed in a measurement volume through which the particles pass during a measurement operation of the particle sensor.

13. The particle sensor as claimed in claim 10, wherein the emitter has a first housing with an exit window, and wherein the receiver has a second housing with an entrance window, and wherein the measurement volume is formed between the exit window of the first housing and the entrance window of the second housing.

14. The particle sensor as claimed in claim 10, wherein the movement device is configured to rotate the calibration plate in the calibration plane.

15. The particle sensor as claimed in claim 10, wherein the movement device is configured to displace the calibration plate in the calibration plane.

16. An apparatus, comprising:
   a measurement chamber capable of being supplied with particles, and
   a particle sensor as claimed in claim 10, for characterizing the particles in the measurement chamber.

* * * * *